United States Patent
Woodard et al.

[19]

[11] Patent Number: 6,034,813
[45] Date of Patent: Mar. 7, 2000

[54] WAVELENGTH SELECTIVE APPLIED FILMS WITH GLARE CONTROL

[75] Inventors: Floyd Eugene Woodard, Belmont; David A. Jones, Mountain View; Reto Furler, Alameda, all of Calif.

[73] Assignee: Southwall Technologies, Inc., Palo Alto, Calif.

[21] Appl. No.: 09/138,823

[22] Filed: Aug. 24, 1998

[51] Int. Cl.[7] .............................. F21V 9/04; G02B 5/28
[52] U.S. Cl. .................. 359/360; 359/585; 359/588; 359/589; 359/590; 428/623; 428/336
[58] Field of Search ..................... 359/360, 585, 359/588, 589, 590, 580; 428/623, 336

[56] References Cited

U.S. PATENT DOCUMENTS

| | | | |
|---|---|---|---|
| 3,775,226 | 11/1973 | Windorf | 359/360 |
| 4,226,910 | 10/1980 | Dahlen et al. | 428/336 |
| 4,368,945 | 1/1983 | Fujimori et al. | 359/360 |
| 4,799,745 | 1/1989 | Meyer et al. | 350/1.7 |
| 5,111,329 | 5/1992 | Gajewski et al. | 359/275 |
| 5,229,881 | 7/1993 | Day et al. | 359/360 |
| 5,337,191 | 8/1994 | Austin | 359/359 |
| 5,513,040 | 4/1996 | Yang | 359/585 |
| 5,557,462 | 9/1996 | Hartig et al. | 359/585 |
| 5,563,734 | 10/1996 | Wolfe et al. | 359/360 |

*Primary Examiner*—Jon Henry
*Attorney, Agent, or Firm*—Law Offices of Terry McHugh

[57] ABSTRACT

A solar control film having low visible light transmittance and low visible light reflectance is comprised of a first sheet of transparent substrate material having deposited thereon a solar-load-reduction film for preferentially reducing infrared light energy transmitted through the film, and a second sheet of transparent substrate material having deposited thereon a thin, transparent film of metal effective to partially block light transmittance, wherein the first sheet of transparent substrate and the second sheet of transparent substrate are separated by an optically massive layer that prevents the constructive and destructive interference of reflected light. A preferred embodiment of a solar control film includes, in order, a pressure-sensitive adhesive layer, a polyethylene terephthalate layer, a Fabry-Perot interference filter layer, an adhesive layer, a grey metal layer, another polyethylene terephthalate layer, and a hardcoat layer. The preferred solar control film provides wavelength selectivity in the infrared range while controlling visible light transmission and minimizing visual light reflectance.

20 Claims, 14 Drawing Sheets

WAVELENGTH SELECTIVE APPLIED FILMS WITH GLARE CONTROL

TECHNICAL FIELD

The invention relates to optical devices, such as solar energy control window films, having low visual light transmission and low visual light reflectance, and to methods of making the same.

BACKGROUND ART

Dyed and vacuum-coated plastic films are applied to windows either to reduce glare or to reduce heat load due to sunlight. To reduce glare, the transmission of visible light ($T_{VIS}$) at wavelengths between 400 nm and 700 nm must be controlled. To reduce heat load, solar transmission ($T_{SOL}$) is blocked in either the visible or the near-infrared (NIR) portions of the solar spectrum (i.e., at wavelengths ranging from 400 nm to 2100 nm).

Primarily through absorption, dyed films can control the transmission of visible light, $T_{VIS}$, to any level desired and consequently afford excellent glare reduction. However, dyed films generally do not block near-infrared solar energy and consequently are not completely effective as solar control films. Another shortcoming of dyed films is that they often fade with solar exposure. In addition, when films are colored with multiple dyes, the dyes often fade at different rates, causing unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and near-infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear float glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance ($R_{VIS}$). A modest degree of selectivity (i.e., higher visible transmission, $T_{VIS}$, than near-infrared transmission) is afforded by certain reflective materials, such as copper and silver.

Traditionally, the best glare reducing coatings have been sputtered grey metals such as stainless steel, chrome, or nickel. The graph of FIG. 1 is a transmission spectra 10 for a sputtered nichrome coating that is designed to transmit approximately 50% of the light at the center of the visible light spectrum. The nichrome film is affixed to a 3.2 mm thick plate of float glass. As can be seen, the transmission of energy is controlled in both the visible (400 nm–700 nm) and near-infrared (700 nm–2100 nm) portions of the solar spectra. A slight degree of wavelength selectivity is observed due to the iron oxide in the glass.

In the graph of FIG. 2, the visible reflectivities $R_{VIS}$ of single and double layer nichrome films of various thicknesses are shown as a function of the corresponding visible light transmission $T_{VIS}$. The data for the graph of FIG. 2 is found in Table 1. Here, the double nichrome films refer to a construct in which two optically isolated sputtered coatings are employed. The two coatings are separated from each other by a relatively thick (i.e., greater than 2 micrometers) layer such as a laminating adhesive. Referring to FIG. 2, the nichrome layer thicknesses decrease from left to right, and as can be seen, as the nichrome layers get thinner the reflection of visible light, $R_{VIS}$, decreases and the transmission of visible light, $T_{VIS}$, increases. The comparison between the single and double layer nichrome films shows that the double layer of nichrome has a substantially reduced $R_{VIS}$ for the same $T_{VIS}$. For example, at a $T_{VIS}$ of 20% the single nichrome coating has an $R_{VIS}$ of 24%, while the double nichrome coating has an $R_{VIS}$ of 13%. As the nichrome layers get thinner, the $R_{VIS}$ of the two films converge.

The degrees of solar rejection achieved by films with single and double layers of nichrome are compared in the graph of FIG. 3. Solar rejection is defined as:

% solar rejection=solar reflection+(0.73×solar absorption).

Within the art, solar rejection is often calculated according to the ASTM E424B method. The slightly better solar rejection noted for the low transmission single nichrome coatings relative to the twin nichrome equivalents is due to solar reflection differences.

A low visible light transmission, $T_{VIS}$, and low visible light reflection, $R_{VIS}$, film utilizing double layers of nichrome is disclosed in U.S. Pat. No. 5,513,040, entitled "Optical device having low visual light transmission and low visible light reflection", issued to Yang. Yang discloses a solar control film having two or more transparent substrates, each bearing a thin, transparent, discontinuous, incoherent film of metal, having low $R_{VIS}$ and a degree of visible light blocking capacity. The substrates are arranged and laminated into a composite such that the visible light blocking capacities of the metal films are effectively combined to provide a composite having low visible light transmittance, $T_{VIS}$. Referring to FIG. 4, Yang specifically describes a film that is affixed to a glass window 20 comprising, in order from top to bottom, a pressure-sensitive adhesive layer 22, a polyethylene terephthalate layer 24, a nichrome layer 26, an adhesive layer 28, a nichrome layer 30, a polyethylene terephthalate layer 32, and a hardcoat layer 34.

A known film used to provide solar control is the silver-based Fabry-Perot interference filter (Fabry-Perot filter). Fabry-Perot filters provide good solar control because the filters have a high degree of wavelength selectivity. For example, using a Fabry-Perot filter, visible light can be transmitted at about 70% while near-infrared solar radiation is transmitted at less than 10%. Coatings utilizing Fabry-Perot filters are aesthetically acceptable in that the visible reflection $R_{VIS}$ of laminated glass structures containing such films can be very low, generally near 10%. An example of the use of a Fabry-Perot interference filter for solar control is disclosed in U.S. Pat. No. 5,111,329, entitled "Solar Load Reduction Panel with Controllable Light Transparency", issued to Gajewski et al.

In applications in which solar control is desired with a minimal effect on the visible optical properties of the window, Fabry-Perot filters are desirable. However, in applications in which glare control is desired as well as solar control, the high visible transmission of Fabry-Perot filters makes them unacceptable. As a result, what is needed is an improved solar control film that has low visible light transmittance and low visible light reflectance.

SUMMARY OF THE INVENTION

The invention is a solar control film having low visible light transmittance and low visible light reflectance that includes a first substrate having a solar-load-reduction film deposited thereon and a second substrate having a thin, transparent film of metal deposited thereon, where both substrates are separated by an optically massive layer. In a preferred embodiment, the solar control film is applied to a window and includes, in order, a pressure-sensitive adhesive layer, a polyethylene terephthalate layer, a Fabry-Perot interference filter layer, an adhesive layer, a grey metal layer, another polyethylene terephthalate layer, and a hardcoat layer. In the solar control film, the preferred PET film thickness ranges from approximately 0.5 to 2 mils. The Fabry-Perot interference filter is deposited onto the first PET layer and selectively excludes a substantial portion of infrared wavelength radiation while transmitting a substantial portion of visible light.

The preferred embodiment of the Fabry-Perot interference filter includes a film stack with: a first continuous indium oxide dielectric film having a thickness in the range of 15–60 nm; a first continuous electrically conductive silver metal film having a thickness in the range of 4–25 nm, a second continuous indium oxide dielectric film having a thickness in the range of 30–1200 nm, a second continuous silver metal film having a thickness in the range of 4–25 nm, and a third continuous indium oxide film having a thickness of about 15–60 nm. The silver metal layers in the Fabry-Perot filter are predominantly silver, with gold or copper being added as an alloy at less than 50% or as cladding layers to achieve improved chemical and light durability. The laminating adhesive is optically massive, which is defined herein as a layer or layer stack that is sufficiently thick to retard or prevent constructive and destructive interference of reflected light. The term "optically massive" is intended to be distinguishable from a layer or layer stack that is optically passive because the layer or layer stack is extremely thin. The grey metal layer is a relatively thin film capable of scattering, diffusing, reflecting, and/or absorbing visible light, but having sufficient thickness to partially block and/or reduce the transmission of visible light through the film. The preferred grey metal layer is nickel chromium that is deposited on the second PET layer at a thickness in the range of 1–20 nm.

Alternative embodiments of the solar control film include incorporating additional grey metal layers onto the film. In one embodiment, an additional grey metal layer is deposited onto the second PET layer opposite the first grey metal layer. In another alternative embodiment, the additional grey metal layer is sputtered onto an additional PET layer and the additional grey metal layer is attached to the second PET layer by an additional adhesive layer. The hardcoat layer is deposited on the third PET layer.

The solar control film of the invention provides improved wave-length selectivity in the infrared range and provides significant improvement in solar rejection. Solar rejection is significantly improved over the prior art as the visible transmission is increased beyond 20%. In addition to solar rejection, the solar reflection of the new control film is improved significantly over prior art films. Solar reflection is particularly significant in applications such as protecting parked cars, where the steady state temperature of the car's interior is of interest.

The use of grey metal for solar control also helps to keep the visible light reflection to below 20% for visible light transmission ranges from 20% to 60%. Advantages of the invention include that the solar control film provides improved wavelength selectivity while efficiently controlling both visible light transmission and visible light reflection to within acceptable ranges.

DETAILED DESCRIPTION

As used in this specification and the appended claims, the following terms have defined meanings:

"$T_{VIS}$" refers to the percentage of visible light or radiation that is transmitted through a transparent optical device, i.e., a window.

"$R_{VIS}$" refers to the percentage of visible light or radiation that is reflected from an optical device, i.e., a window.

"$A_{VIS}$" refers to the percentage of visible light or radiation that is absorbed by an optical device.

"$T_{SOL}$" refers to the percentage of solar energy that is transmitted through an optical device.

"$R_{SOL}$" refers to the percentage of solar energy that is reflected from an optical device.

"$A_{SOL}$" refers to the percentage of solar energy that is absorbed by an optical device.

"%SR" refers to the percent of solar rejection from an optical device.

"SC" or "shading coefficient" refers to the heat gain obtained when an environment is exposed to solar radiation through a given area opening fitted with a particular glazing compared to the heat gain obtained through the same area fitted with a 3.2 mm single pane clear glass (ASHRAE standard calculation method).

Figure 5:
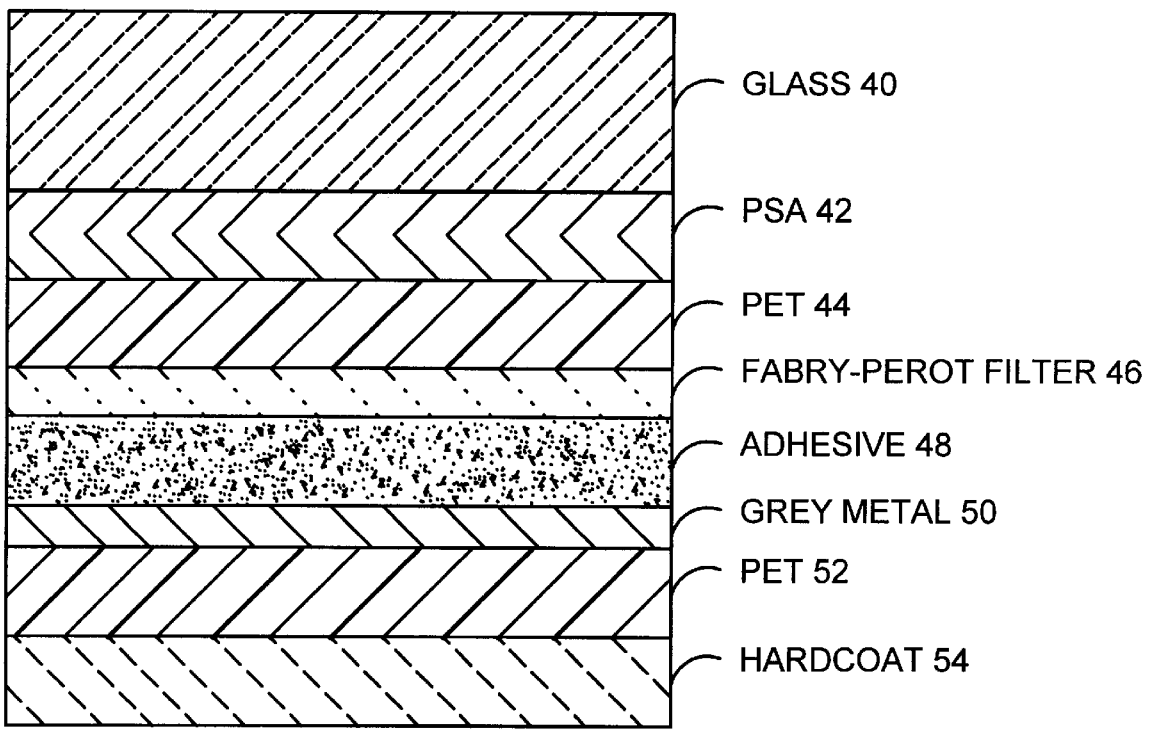
FIG. 5 is a solar control film having a Fabry-Perot interference filter and a grey metal layer in accordance with the invention.

FIG. 5 is a depiction of the preferred embodiment of a solar control film having low visible light transmittance and low visible light reflectance. The preferred embodiment is shown for reference attached to a glass layer 40 and includes, in order from top to bottom, a pressure-sensitive adhesive layer 42, a polyethylene terephthalate layer 44, a Fabry-Perot interference filter layer 46, an adhesive layer 48, a grey metal layer 50, another polyethylene terephthalate layer 52, and a hardcoat layer 54. The glass layer 40 can be any type of glass or plastic window material and is commonly 3.2 mm float glass.

The pressure-sensitive adhesive layer (PSA) 42 can be any type of adhesive that enables the solar control film to be affixed to the glass 40. In order to attach the solar control film to the glass, one surface of the solar control film is coated with the pressure-sensitive adhesive (PSA) and a release sheet is removed from the PSA before application of the film to the glass. As is known in the art, ultra-violet absorption additives can be incorporated into the PSA.

The polyethylene terephthalate (PET) layer 44 is the preferred material for the substrate layer of the solar control film. The substrate may include any of the transparent supporting materials conventionally used for a solar control film, particularly flexible polymer films supplied in web form. As depicted, the preferred polymer is a PET film having a thickness ranging from approximately 0.5 to 2 mils and up to approximately 50 mils. The refractive index of such films typically ranges from 1.4–1.7. The type of substrate is not critical to the invention.

Figure 6:
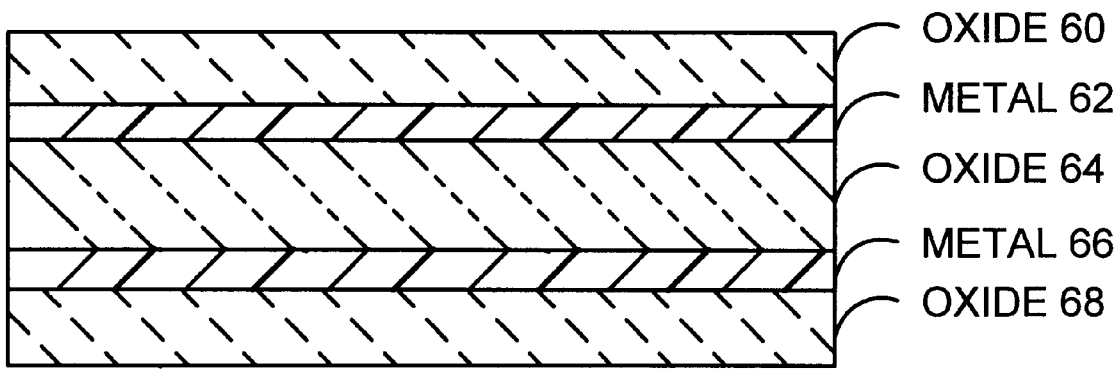
FIG. 6 is an expanded view of a preferred Fabry-Perot interference filter in accordance with the invention.

The next layer in the solar control film is the Fabry-Perot interference filter layer (Fabry-Perot filter) 46, referred to generally as a solar-load-reduction (SLR) film. The Fabry-Perot filter is deposited onto the PET layer 44 and selectively excludes a substantial portion of infrared wavelength radiation, while transmitting a substantial portion of visible light. An expanded view of the preferred Fabry-Perot filter is depicted in FIG. 6. The preferred embodiment is a film stack including, in order, from top to bottom: a first continuous indium oxide dielectric film 60 having a thickness in the range of 15–60 nm; a first continuous electrically conductive silver metal film 62 having a thickness in the range of 4–25 nm; a second continuous indium oxide dielectric film 64 having a thickness in the range of 30–1200 nm; a second continuous silver metal film 66 having a thickness in the range of 4–25 nm; and a third continuous indium oxide dielectric film 68 having a thickness in the range of 15–60 nm.

Figure 7:
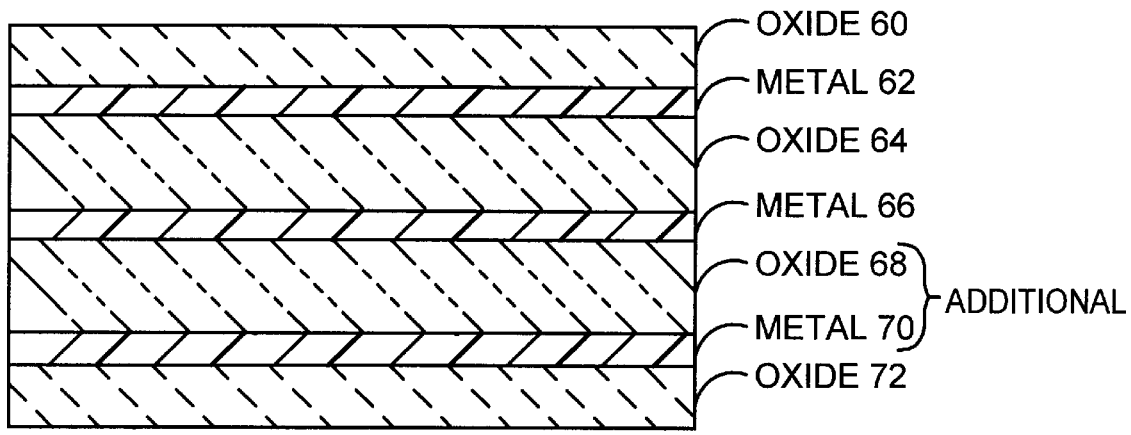
FIG. 7 is an expanded view of an alternative Fabry-Perot interference filter in accordance with the invention.

FIG. 7 is an expanded depiction of an alternative Fabry-Perot filter that may be substituted in place of the preferred Fabry-Perot filter. The alternative Fabry-Perot filter includes two additional film layers, an additional metal layer 70, and an additional oxide layer 72. In the alternative, the thickness of the third indium oxide film 68 is increased to 30–1200 nm. The additional metal layer 70 is a third continuous silver metal film, preferably deposited on the third indium oxide film 68 and having a thickness in the range of 4–25 nm. The additional oxide layer 72 is a fourth continuous indium oxide dielectric film, preferably deposited on the third metal layer, having a thickness in the range of 15–60 nm.

The metal layers 62, 66, and 70 in the Fabry-Perot filters are predominantly silver with gold or copper being added as an alloy at less than 50% or as cladding layers to achieve improved chemical and light durability. Although indium oxide is preferred for the oxide layers 60, 64, 68, and 72, other oxides, such as zinc oxide, tin oxide, titanium oxide, and niobium oxide, may be used where oxides refers loosely to transparent dielectric layers with refractive indices of 1.5 or more with visible absorption levels of less than 10%. Nitrides, fluorides, and the like can also be used, provided they are suitably transparent and have a real refractive index greater than 1.5.

More specific details on the design, performance, and methods for producing Fabry-Perot filters are disclosed in U.S. Pat. No. 4,799,745 entitled, "Heat Reflecting Composite Films and Glazing Products Containing the Same", which is assigned to the assignee of the present invention.

Referring back to FIG. 5, the laminating adhesive 48 can be any conventional laminating adhesive used for solar control films that is optically massive and thus retards constructive and destructive interference of reflected light. The laminating adhesive is located between the grey metal layer 50 and the Fabry-Perot filter 46 and should have a thickness of 2 micrometers ($\mu$m) or more. A thickness of 2 $\mu$m or more helps ensure that the reflected light from the grey metal layer and the Fabry-Perot filter is incoherent, in that coloration due to destructive and constructive interference is not apparent.

The grey metal layer 50 is preferably a metal or alloy, such as nickel-chromium (nichrome or NiCr) that is formed on the second PET layer at a thickness in the range of 2–20 nm. Other grey metals or alloys that can be used include stainless steel, inconel, monel, chrome, or nichrome alloys. Metals which are not considered grey but are "grey-like" when deposited thinly or under conditions which encourage the growth of non-continuous coatings include copper, gold, aluminum, and silver and can also be used. In general, the metal layer must be a thin film capable of scattering, diffusing, reflecting, and/or absorbing visible light, but having sufficient thickness to reduce the transmission of visible light through the film. The metal film is most preferably sputter deposited onto the substrate, however other vacuum deposition techniques can be used.

For the low reflectance films contemplated by the invention, the coating should be sufficiently thin that the visual reflectance, $R_{VIS}$ of the metal layer does not exceed approximately 20%. Generally, the metal layer thickness would fall in the range of 1 to 20 nm.

The next PET layer 52 has substantially the same characteristics as the first PET layer 44, except that it has the grey metal layer 50 deposited onto its surface instead of a Fabry-Perot filter 46.

In order to protect the solar control film for use on windows, the exposed surface of the PET layer 52 of the film is coated with a scratch and wear resistant hardcoat 54. The hardcoat layer improves the durability of the flexible substrate during processing and during use of the end product. Hardcoat layers are known in the art. The hardcoat layer can be any one of known materials, such as silica-based hardcoats, siloxane hardcoats, melamine hardcoats, acrylic hardcoats, and the like. Such materials typically have reflective indices of 1.4 to 1.6. An acceptable thickness range for the hardcoat layer is from 1 $\mu$m to 20 $\mu$m. The hardcoat layer is not critical to the invention.

Figure 8:
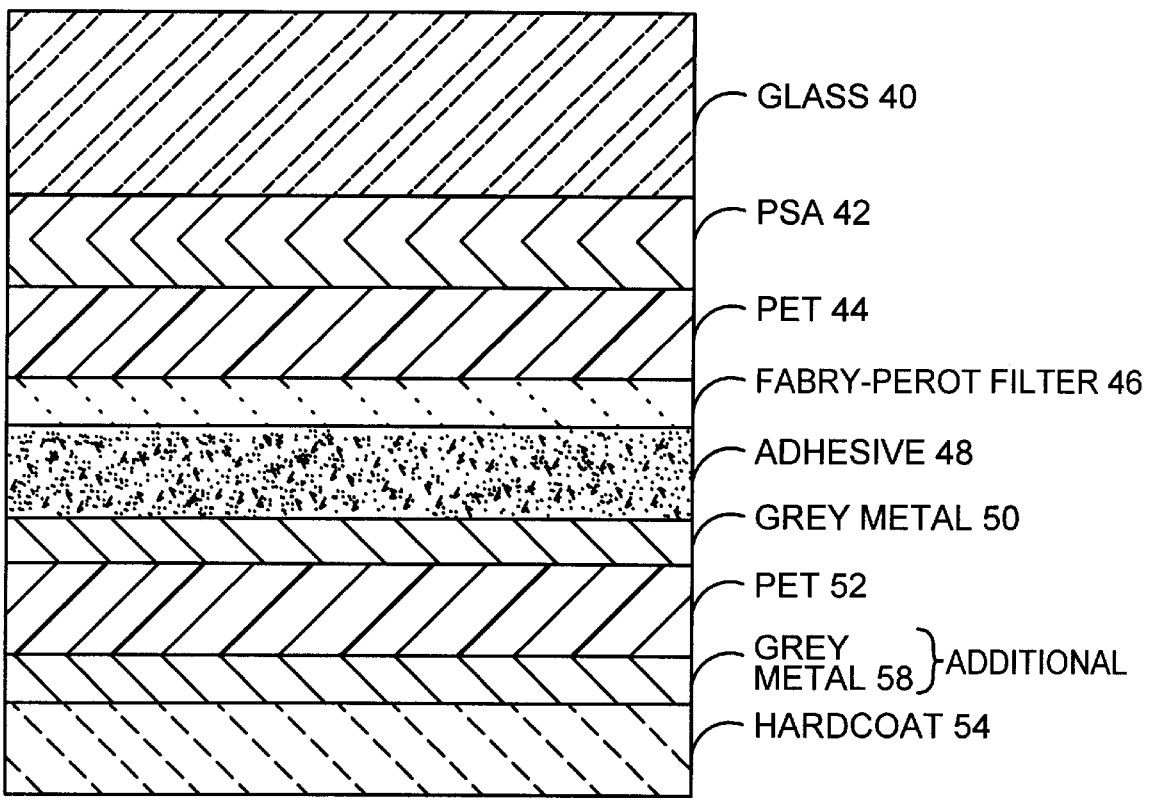
FIG. 8 is a depiction of an alternative solar control film having an additional grey metal layer in accordance with the invention.
Figure 9:
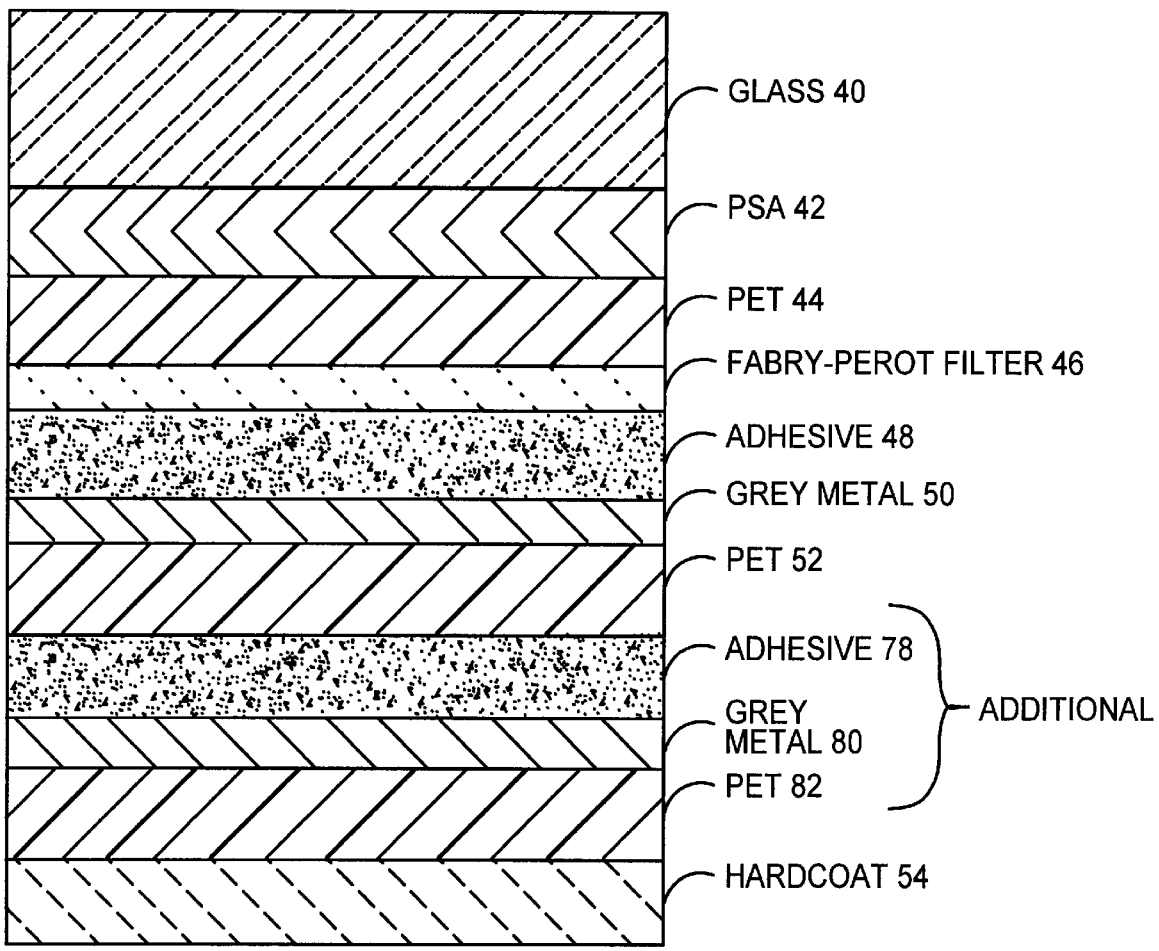
FIG. 9 is a depiction of an alternative solar control film having an additional metal layer deposited on an additional PET layer affixed by an additional adhesive layer in accordance with the invention.

FIGS. 8 and 9 are depictions of alternative embodiments of the solar control film. Both embodiments incorporate an additional grey metal layer onto the film. Referring to FIG. 8, the additional grey metal layer 58 is deposited onto the second PET layer 52 opposite the first grey metal layer 50. Within the solar control film, the additional metal layer 58 is located between the second PET layer 52 and the hardcoat 54. Referring to FIG. 9, the additional grey metal layer 80 is sputtered onto an additional PET layer 82 and the additional grey metal layer is attached to the second PET layer 52 by an additional adhesive layer 78. The hardcoat layer 54 is deposited on the additional PET layer 82.

Figure 1:
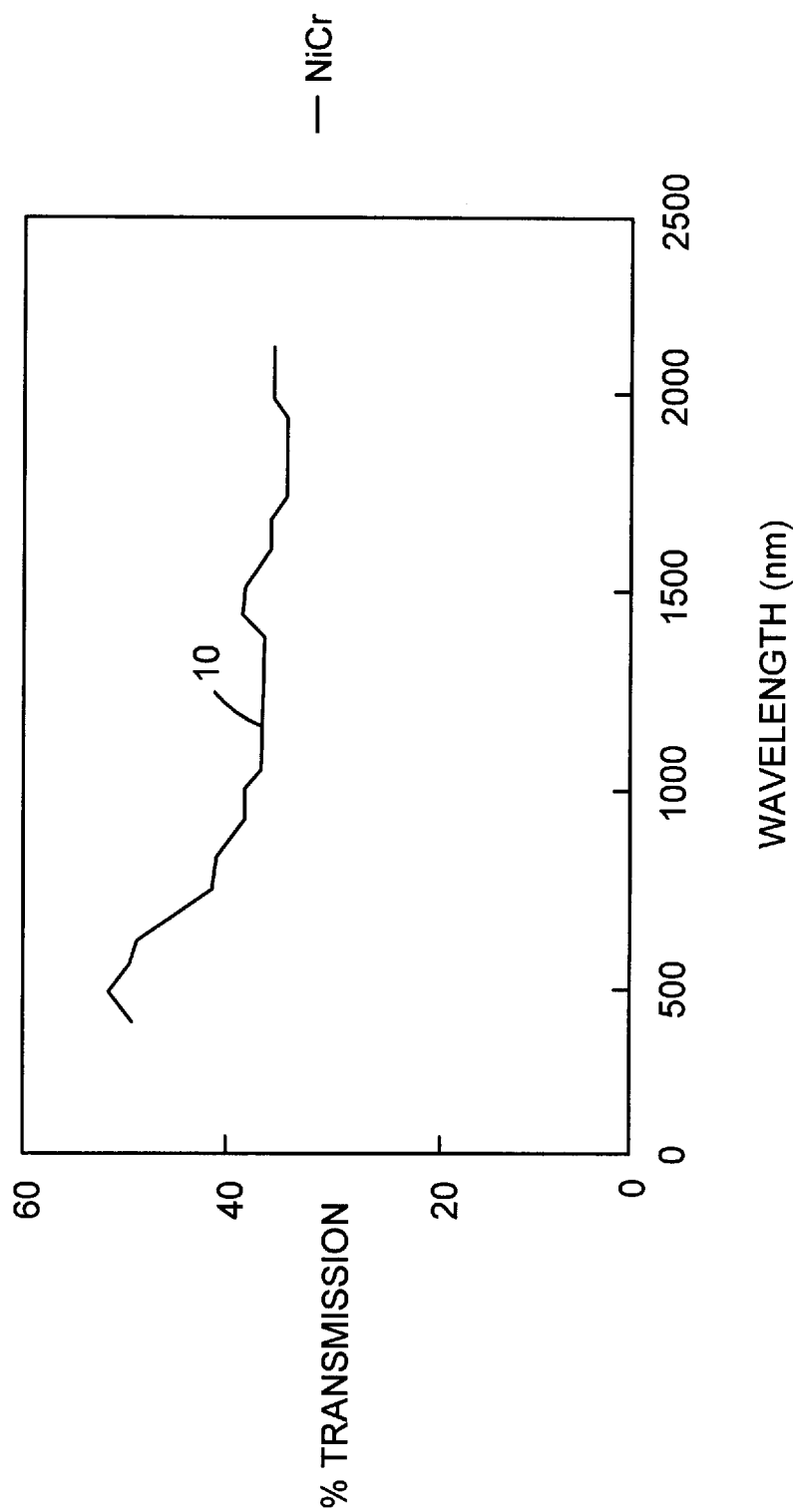
FIG. 1 is a graph of a transmission spectra for a single layer nichrome film that is designed to transmit approximately 50% of the light at the center of the visible light spectrum.
Figure 2:
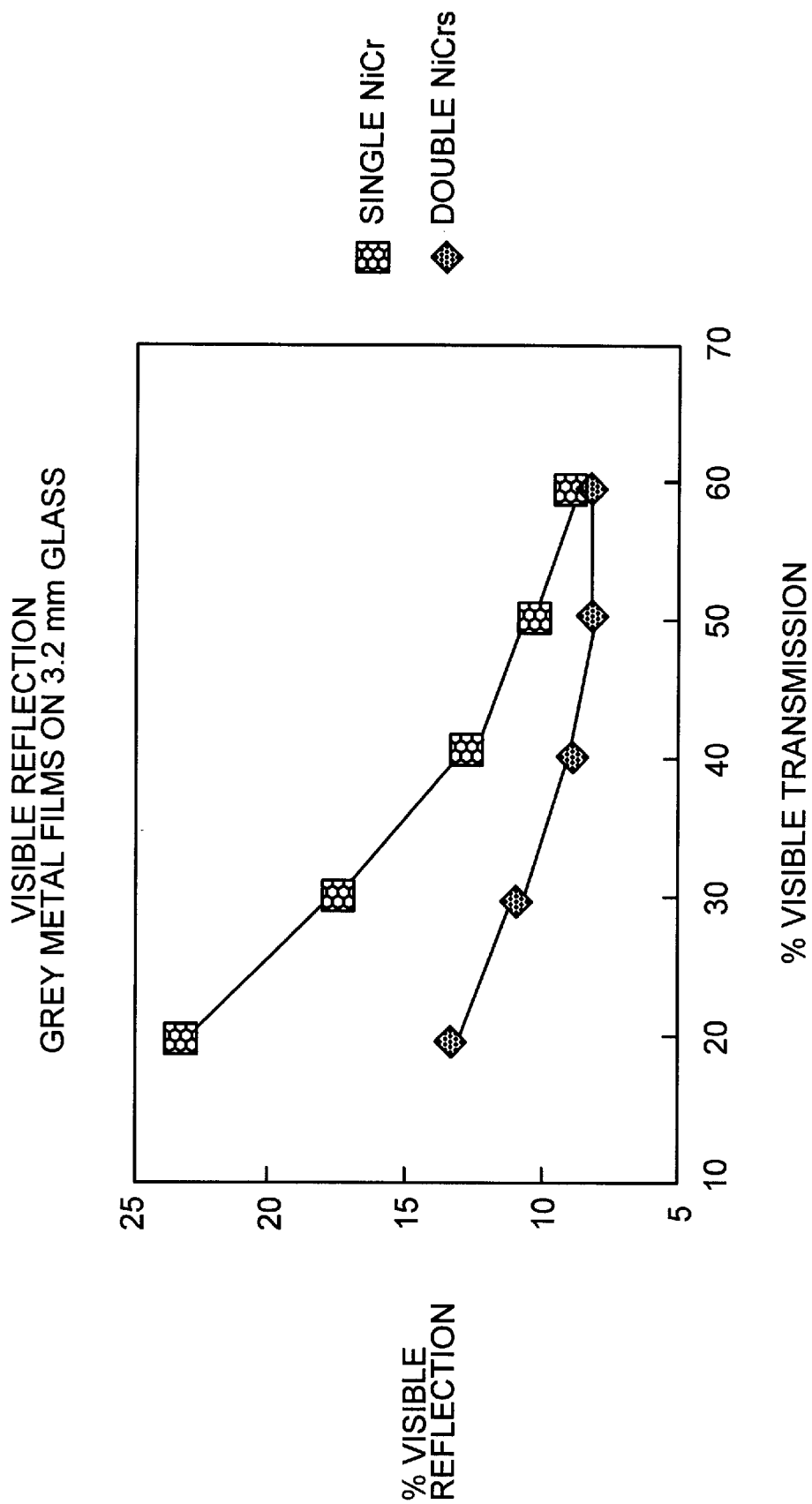
FIG. 2 is a graph of visible light reflection versus visible light transmission as a function of film thickness for a single layer nichrome film and a double layer nichrome film on 3.2 mm glass.
Figure 3:
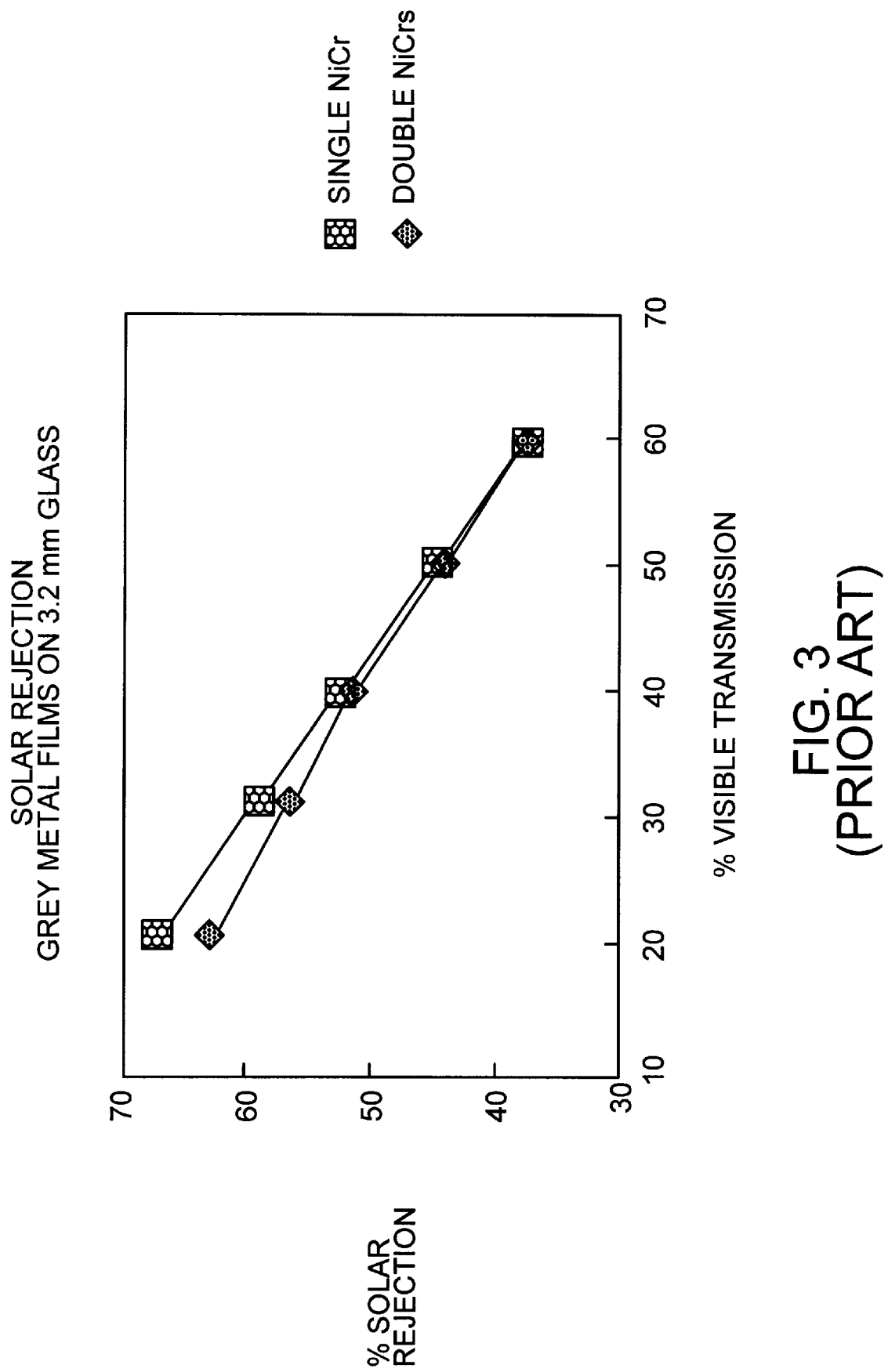
FIG. 3 is a graph of the percent of solar rejection versus visible light transmission as a function of film thickness for a single layer nichrome film and a double layer nichrome film on 3.2 mm glass.
Figure 4:
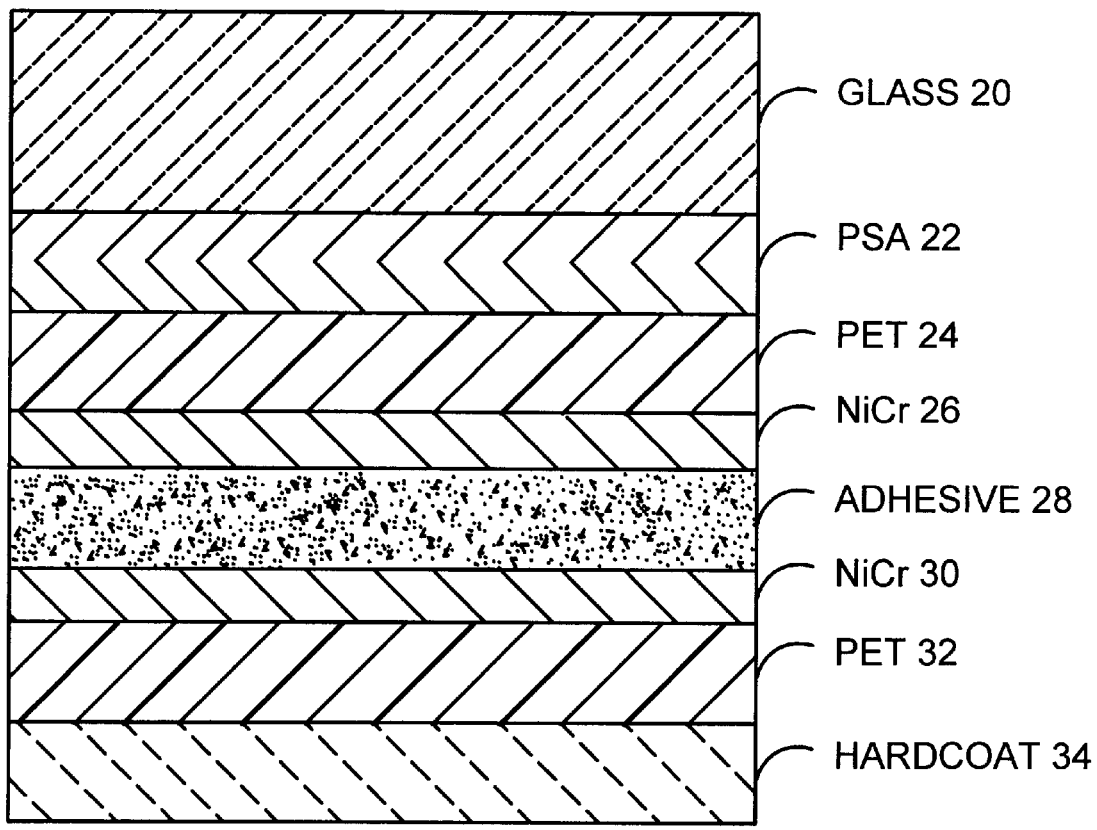
FIG. 4 is a solar control film having double nichrome layers in accordance with the prior art.
Figure 10:
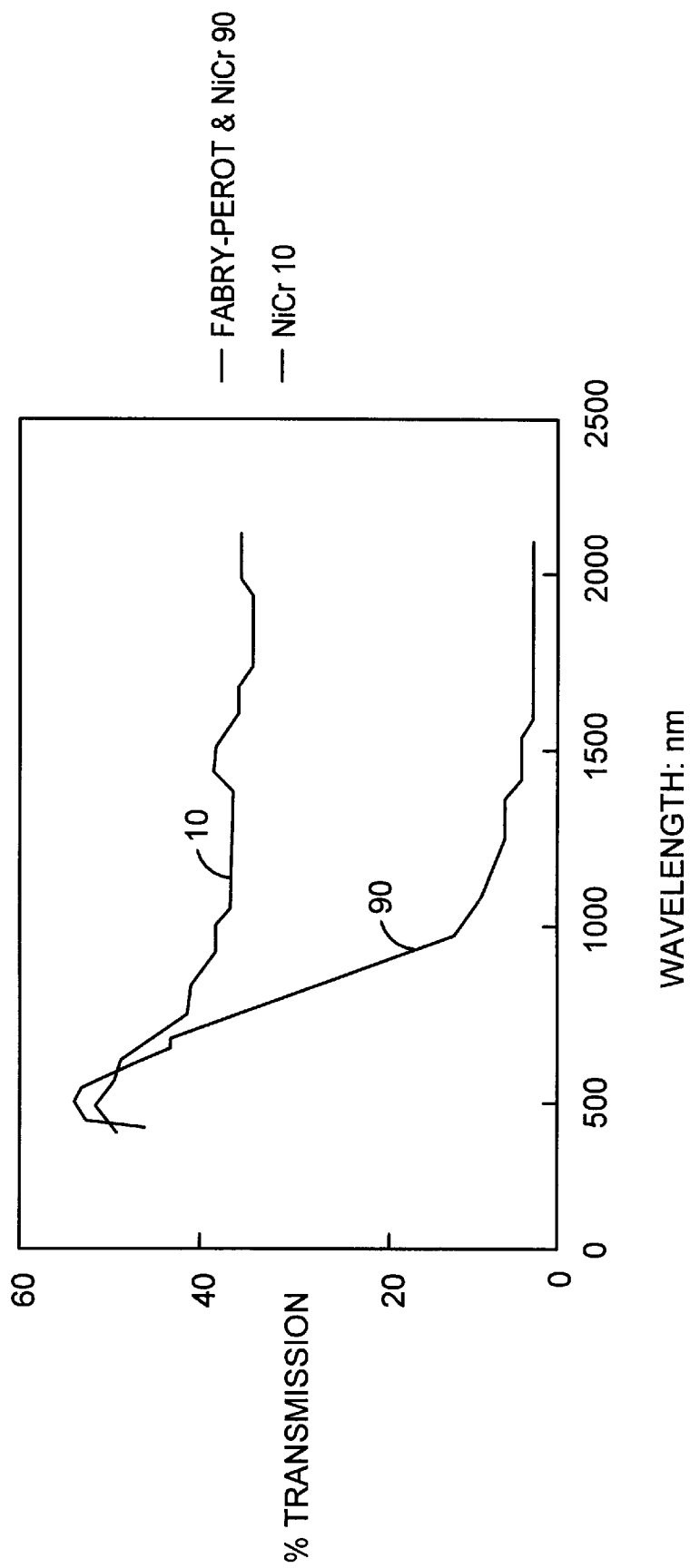
FIG. 10 is a graph of a transmission spectra for a solar control film versus the graph of the single layer nichrome film in FIG. 1 where both films are designed to transmit approximately 50% of the light at the center of the visible light spectrum.

Performance comparison data for the new solar control film is shown in Table 1 and depicted in the graphs of FIGS. 10–13. Referring to Table 1, in the left eight columns, optical properties are given for laminated glass structure as described in the table. In some cases, given in the last four columns, is a description of the optical properties of the single layer metal (i.e., NiCr or Ag) used in the laminated structure. Referring to FIG. 10, the transmission spectra for the new solar control film 90 for the case where $T_{VIS}=50\%$ is compared to the transmission spectra for the film with a single layer 10 of nichrome as shown in the graph of FIG. 1. The improvement in solar rejection afforded by the invented solar control film is evident by the wavelength selectivity in the infrared range that is provided by the new solar control film. As is shown in later graphs, the solar rejection of the new solar control film is particularly significant at higher visible transmission levels and there is little advantage gained by applying a Fabry-Perot filter when the visible transmission is controlled to below 20%.

TABLE 1

FABRY-PEROT AND NiCr APPLIED FILMS

| | ⅛-inch Glass + Film (Fabry-Perot + NiCr) | | | | | | | Metal Only Properties Facing the Coating | | | |
|---|---|---|---|---|---|---|---|---|---|---|---|
| NiCr Thick. | $T_{VIS}$ | $R_{VIS}$ | $T_{SOL}$ | $R_{SOL}$ | $A_{SOL}$ | % SR | SC | $T_{VIS}$ | $R_{VIS}$ | $A_{VIS}$ | $A_{VIS}/R_{VIS}$ |
| 0.00 | 72.80 | 9.20 | 43.90 | 22.60 | 33.50 | 47.10 | 0.61 | | | | |
| 2.45 | 60.00 | 9.10 | 36.00 | 22.50 | 41.50 | 52.80 | 0.54 | 70.50 | 13.80 | 15.70 | 1.14 |
| 4.98 | 50.00 | 10.00 | 29.90 | 23.00 | 47.10 | 57.40 | 0.49 | 57.30 | 17.50 | 25.20 | 1.44 |
| 8.45 | 40.00 | 12.00 | 23.80 | 24.10 | 52.10 | 62.10 | 0.44 | 44.40 | 22.80 | 32.80 | 1.44 |
| 13.4 | 30.00 | 15.40 | 17.90 | 25.90 | 56.30 | 67.00 | 0.38 | 32.30 | 29.80 | 37.90 | 1.27 |
| 21.5 | 20.00 | 20.30 | 11.90 | 28.40 | 59.70 | 72.00 | 0.32 | 20.80 | 38.30 | 40.90 | 1.07 |

| Each NiCr Thick. | ⅛-inch glass + Film (Fabry-Perot + NiCr + NiCr) | | | | | | |
|---|---|---|---|---|---|---|---|
| | $T_{VIS}$ | $R_{VIS}$ | $T_{SOL}$ | $R_{SOL}$ | $A_{SOL}$ | % SR | SC |
| 1.10 | 60.00 | 9.00 | 35.90 | 22.50 | 41.60 | 52.90 | 0.54 |
| 2.27 | 50.00 | 9.10 | 29.80 | 22.60 | 47.60 | 57.30 | 0.49 |
| 3.80 | 40.00 | 9.80 | 23.70 | 22.90 | 53.40 | 61.90 | 0.44 |
| 5.90 | 30.00 | 11.10 | 17.70 | 23.60 | 58.70 | 66.50 | 0.39 |
| 9.12 | 20.00 | 13.40 | 11.70 | 24.80 | 63.40 | 71.10 | 0.33 |

| | ⅛th in glass + Film (Fabry-Perot + Ag) | | | | | | | Metal Only Properties Facing the Coating | | | |
|---|---|---|---|---|---|---|---|---|---|---|---|
| Ag Thick. | $T_{VIS}$ | $R_{VIS}$ | $T_{SOL}$ | $R_{SOL}$ | $A_{SOL}$ | % SR | SC | $T_{VIS}$ | $R_{VIS}$ | $A_{VIS}$ | $A_{VIS}/R_{VIS}$ |
| 8.00 | 60.00 | 16.70 | 34.80 | 26.90 | 38.30 | 54.90 | 0.52 | 69.30 | 26.20 | 4.50 | 0.17 |
| 12.10 | 50.00 | 24.00 | 28.50 | 30.70 | 40.80 | 60.50 | 0.45 | 55.30 | 39.30 | 5.40 | 0.14 |
| 16.10 | 40.00 | 31.70 | 22.60 | 34.60 | 42.80 | 65.80 | 0.39 | 42.80 | 51.40 | 5.80 | 0.11 |
| 20.80 | 30.00 | 39.60 | 17.00 | 38.60 | 44.60 | 71.20 | 0.33 | 31.00 | 63.30 | 5.70 | 0.09 |
| 26.90 | 20.00 | 47.80 | 11.50 | 42.30 | 46.10 | 76.00 | 0.28 | 19.80 | 74.60 | 5.60 | 0.08 |

| | ⅛-inch glass + Film (NiCr + NiCr) | | | | | | | Metal Only Properties Facing the Coating | | | |
|---|---|---|---|---|---|---|---|---|---|---|---|
| NiCr Thick. | $T_{VIS}$ | $R_{VIS}$ | $T_{SOL}$ | $R_{SOL}$ | $A_{SOL}$ | % SR | SC | $T_{VIS}$ | $R_{VIS}$ | $A_{VIS}$ | $A_{VIS}/R_{VIS}$ |
| 2.27 | 60.00 | 8.00 | 53.60 | 7.50 | 38.90 | 35.90 | 0.74 | 71.60 | 13.60 | 14.80 | 1.09 |
| 3.50 | 50.00 | 8.10 | 44.00 | 7.70 | 48.20 | 42.90 | 0.66 | 64.50 | 15.30 | 20.20 | 1.32 |
| 5.08 | 40.00 | 8.90 | 34.70 | 8.50 | 56.70 | 49.90 | 0.58 | 56.80 | 17.70 | 25.50 | 1.44 |
| 7.27 | 30.00 | 10.40 | 25.60 | 10.10 | 64.30 | 57.00 | 0.49 | 48.30 | 21.00 | 30.70 | 1.46 |
| 10.70 | 20.00 | 13.30 | 16.70 | 13.00 | 70.30 | 64.30 | 0.41 | 38.40 | 26.00 | | |

| NiCr Thick. | ⅛-inch glass + Film (NiCr) | | | | | | |
|---|---|---|---|---|---|---|---|
| | $T_{VIS}$ | $R_{VIS}$ | $T_{SOL}$ | $R_{SOL}$ | $A_{SOL}$ | % SR | SC |
| 4.75 | 60.00 | 8.20 | 53.70 | 7.80 | 38.50 | 35.90 | 0.74 |
| 7.50 | 50.00 | 9.50 | 44.20 | 9.30 | 46.50 | 43.20 | 0.65 |
| 11.20 | 40.00 | 12.40 | 34.90 | 12.30 | 52.80 | 50.80 | 0.57 |
| 16.60 | 30.00 | 17.10 | 25.70 | 16.90 | 57.30 | 58.70 | 0.47 |
| 25.00 | 20.00 | 23.60 | 17.00 | 23.30 | 59.70 | 66.90 | 0.38 |

Figure 11:
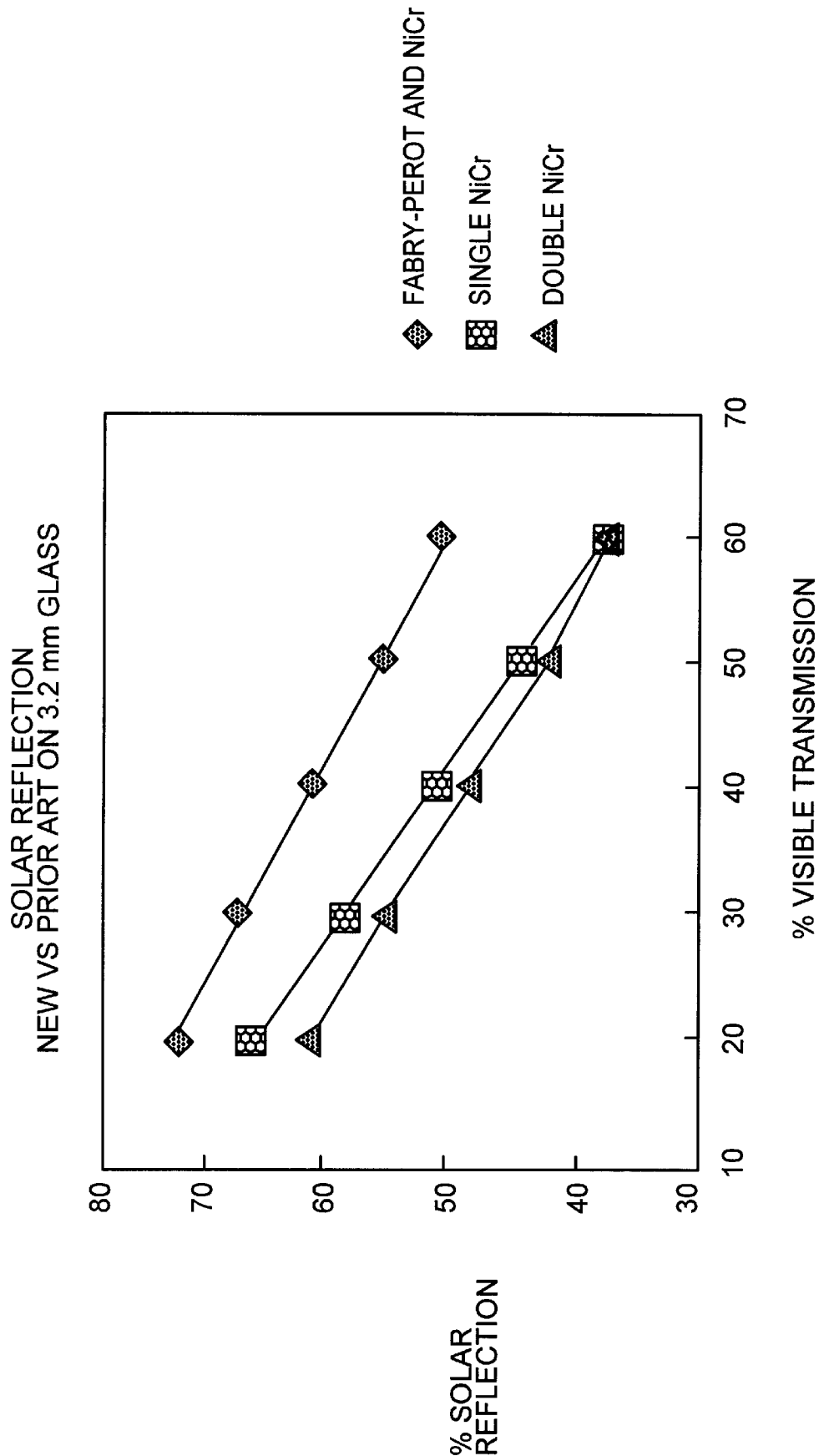
FIG. 11 is a graph of solar rejection versus visible light transmission as a function of film thickness for the solar control film of the invention and single layer nichrome and double layer nichrome films as known in the prior art.

The solar rejection characteristics of a film with a nichrome layer laminated to a Fabry-Perot filter in accordance with the invention are compared to a film with a single layer and a double layer of nichrome in the graph of FIG. 11. As can be seen, the solar rejection of the new solar control film is improved significantly over the single and double layer nichrome films as the visible transmission is increased beyond 20%. For example, at a $T_{VIS}$ of 20% the new solar control film rejects approximately 72% of the solar energy, while the single layer nichrome film rejects approximately 67% of the solar energy and the double layer nichrome film rejects approximately 64% of the solar energy. The solar rejection gap widens as the metal layers become thinner such that at a $T_{VIS}$ of 60% the new solar control film rejects approximately 53% of the solar energy, while the single layer and double layer nichrome films each reject approximately 36% of the solar energy.

Figure 12:
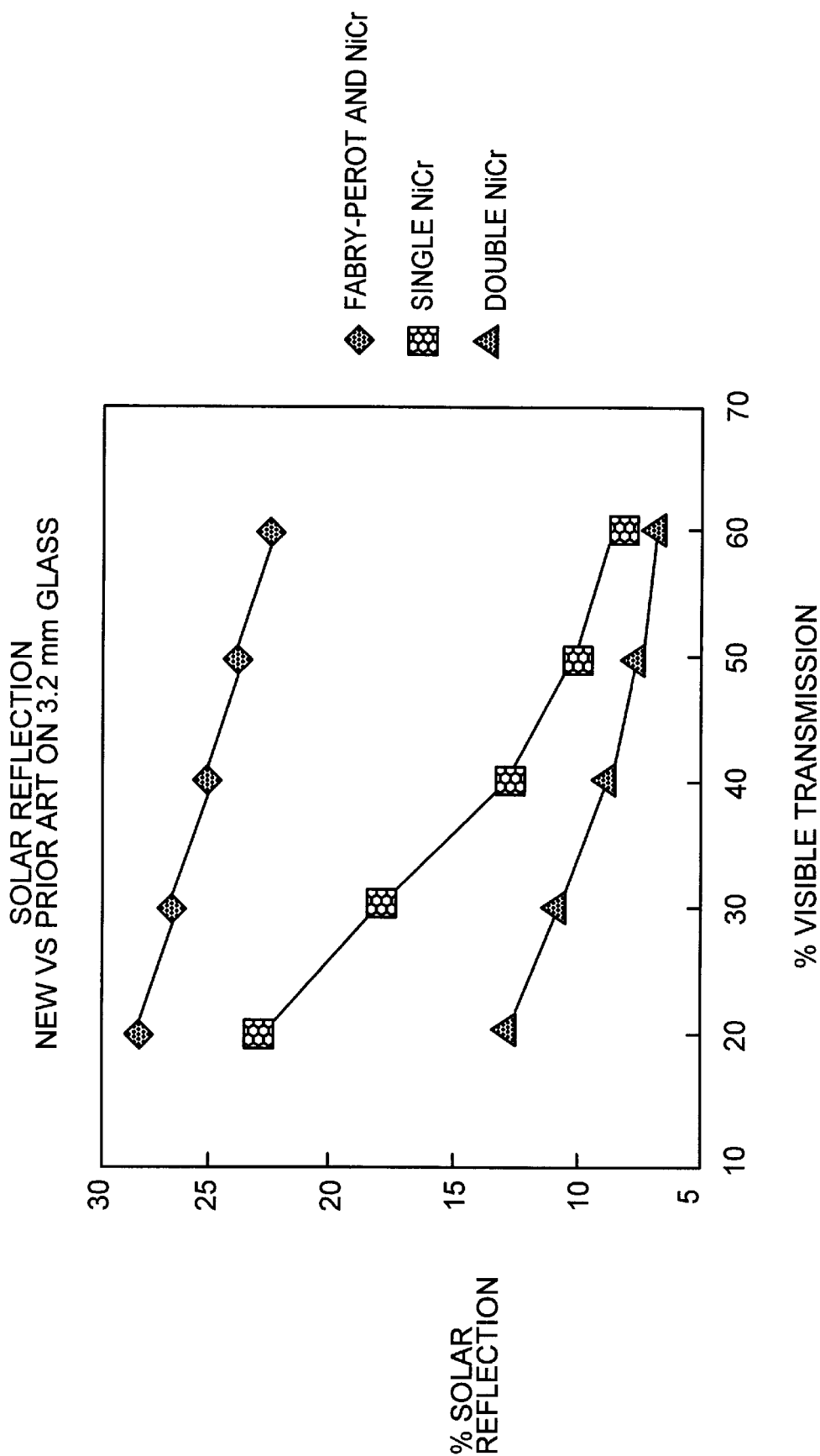
FIG. 12 is a graph of solar reflection versus visible light transmission as a function of film thickness for the solar control film of the invention and single layer nichrome and double layer nichrome films as known in the prior art.

The full significance with regard to solar control of the added Fabry-Perot filter is not evident from solar rejection alone. The benefit is more evident when solar reflection differences are examined as shown in FIG. 12. As can be seen, the solar reflection of the new solar control film is improved significantly over the single and double layer nichrome films. For example, at a $T_{VIS}$ of 20% the new solar control film reflects approximately 28% of the solar energy, while the single layer nichrome film reflects approximately 23% of the solar energy and the double layer nichrome film reflects approximately 13% of the solar energy. The solar reflection gap widens as the metal layers become thinner such that a $T_{VIS}$ of 60% the new solar control film reflects approximately 23% of the solar energy, while the single layer nichrome film and the double layer nichrome film reject approximately 8% and approximately 7% of the solar energy, respectively.

Figure 13:
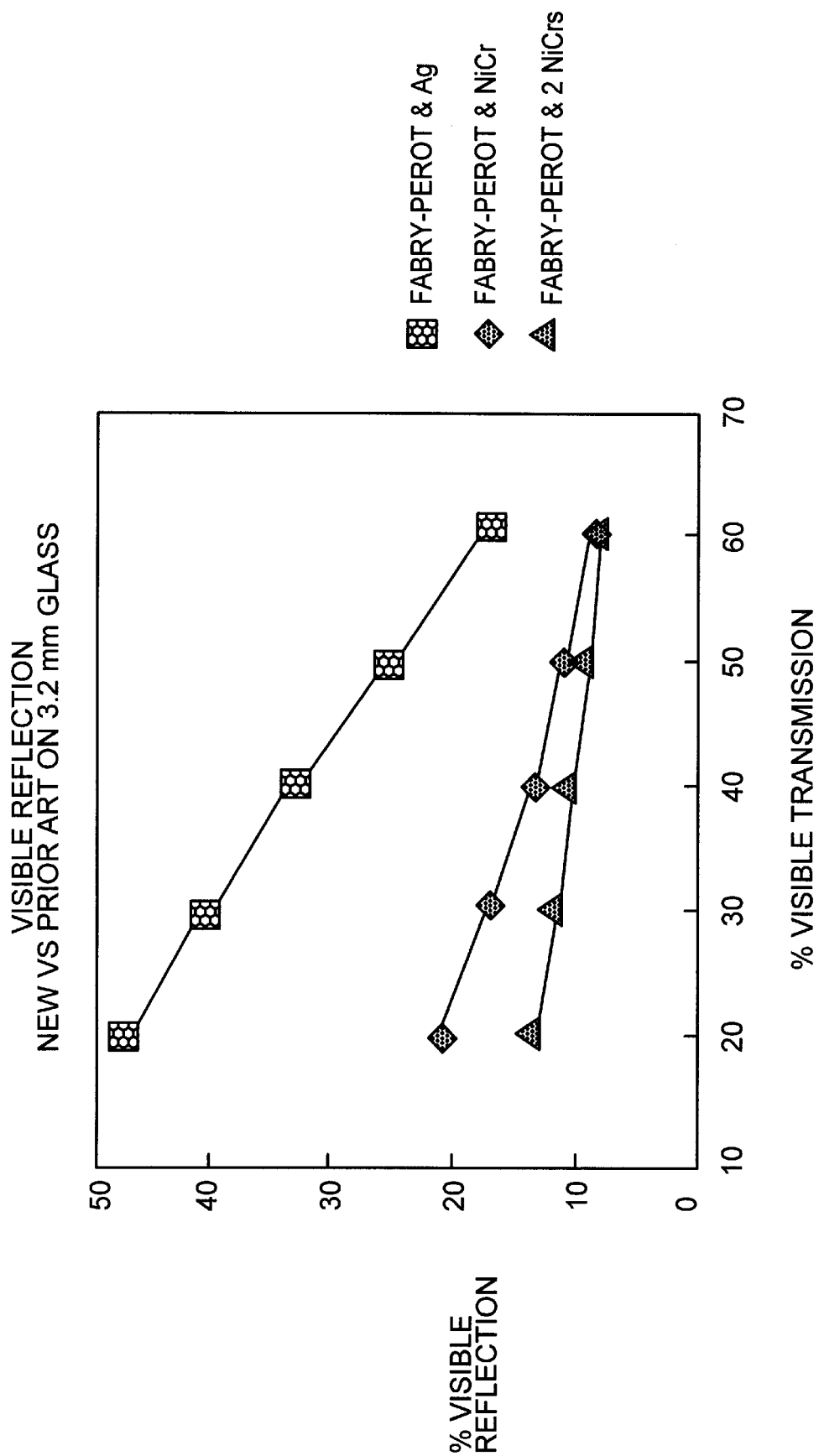
FIG. 13 is a graph of visible light reflection versus visible light transmission as a function of film thickness for three solar control films in accordance with the invention.

Solar reflection is particularly significant in applications such as protection of parked cars, where the steady state temperature of the car's interior is of interest. Solar reflection is preferred over solar absorption for blocking solar energy because energy that is absorbed by auto glass can be transferred either inward or outward depending on air flow, surface emissivities, temperatures of bodies on opposite sides of the glass, etc. Absorption of solar energy in a car's windows slows down of the rate of temperature rise, however, it does not limit the eventual equilibrium temperature inside the car. On the other hand, solar rejection by reflection is independent of environmental conditions and has the effect of reducing the equilibrium temperature in parked cars. The use of grey metal for the solar control film helps to keep visible light reflection, $R_{VIS}$, as low as possible. Referring to FIG. 13, the effects of using a silver rather than a nichrome film to reduce the transmission of a Fabry-Perot filter are shown. The resulting reflectivity is much higher for a given transmission if a highly reflective metal such as silver (or aluminum) is used. For example, at a $T_{VIS}$ of 20% a solar control film with silver reflects approximately 48% of the visible light, while a solar control film with one nichrome layer reflects approximately 20% of the visible light and a solar control film with double nichrome layers reflects approximately 13% of the visible light. The gap between visible reflection narrows as the metal layers get thinner.

The reflective aspects of the invented solar control film can be specified by giving limits for k/n values for the grey metal. Another way, which is more readily determined, to specify metal greyness is to measure the reflection and transmission of a coated film and determine the $A_{VIS}$ to $R_{VIS}$ ratio where the film is not laminated to glass. As evident from the data for silver and nichrome in Table 1, greyer metals will have a higher $A_{VIS}/R_{VIS}$ ratio. The $A_{VIS}/R_{VIS}$ ratio for nichrome is from 1.07 to 1.44 over the thicknesses considered here. The $A_{VIS}/R_{VIS}$ ratio for silver is from 0.08 to 0.17. A reasonable cut-off for the new solar control film for the sputtered metal on PET is an $A_{VIS}/R_{VIS}$ of greater than 0.6. Here, reflection is measured from the coated side of the substrate. Note that it is not simply the type of material used which determines if a deposited layer is a "grey metal". Even reflective metals such as aluminum, when deposited at high pressures with undesirable background gases such as oxygen and water, can grow as discontinuous layers, and have optical properties which are like those of grey metals.

Figure 14:
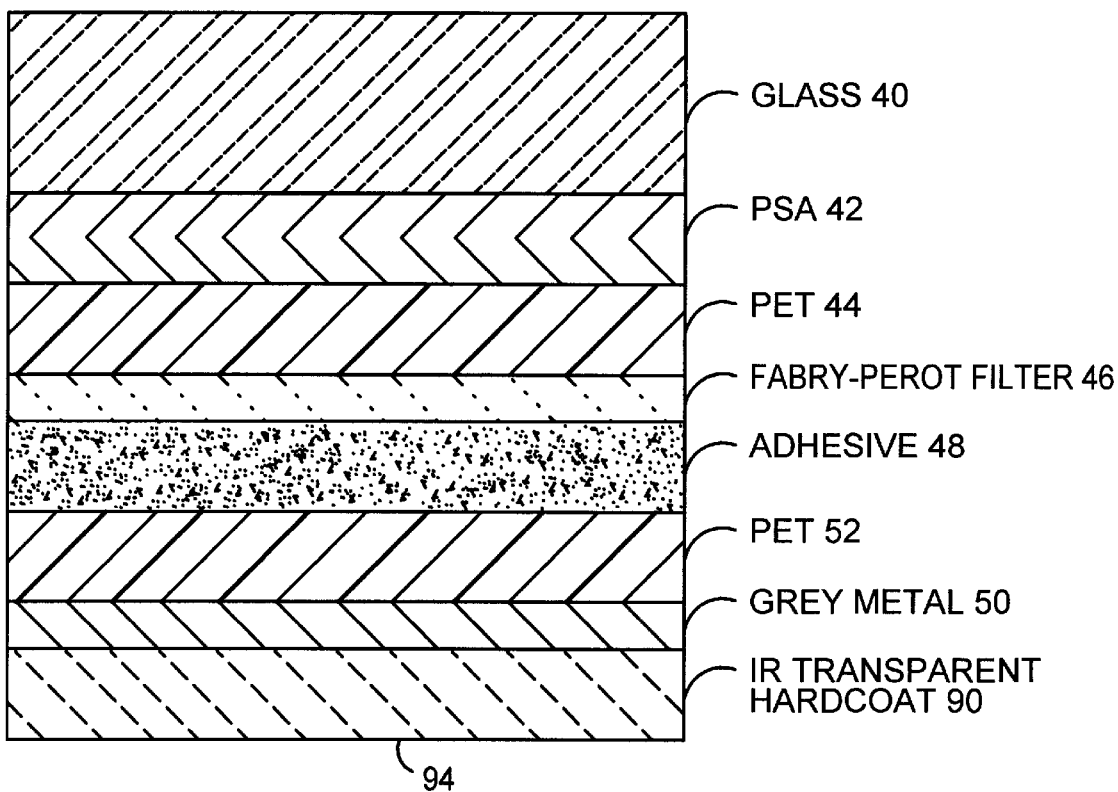
FIG. 14 is an alternative embodiment of the solar control film where the second PET layer and the grey metal layer are reversed and the grey metal layer is coated with an infrared transparent hardcoat.

Another alternative embodiment for the solar control film is depicted in FIG. 14. This solar control film has the grey metal layer 50 and the second PET layer 52 reversed as compared to the preferred embodiment of FIG. 5, so that the grey metal is closest to the film surface 94. The grey metal is then coated with an infrared transparent hardcoat 90 such as that disclosed by U.S. Pat. No. 4,226,910, entitled "Energy Control Sheet Having Insulative Properties", issued to Dahlen et al. The infrared transparent hardcoat has reduced emissivity which minimizes heat transfer near the surface of the film. The embodiment of the solar control film can be used effectively on the inside of architectural or automotive windows to minimize radiative heat transfer into the building or cars. The solar control film would also reflect heat back into the enclosure, slightly increasing heat retention.

What is claimed is:

1. A solar control film having low visible light transmittance and low visible light reflectance comprising:

a first sheet of transparent substrate material having deposited thereon a solar-load-reduction (SLR) film for preferentially reducing infrared light energy transmitted through said SLR film, said SLR film comprising a film stack on a first surface of said first sheet, said film stack including at least a first dielectric film proximate to said first sheet, a first metal film, a second dielectric film, a second metal film, and a third dielectric film;

a second sheet of transparent substrate material having deposited thereon a transparent film of metal effective to partially block light transmittance and to have a low visible light reflectance; and an optically massive layer located between said first and second transparent substrates.

2. The solar control film of claim 1 wherein said optically massive layer has optical characteristics that retard constructive and destructive interference of light reflected between said first sheet and said second sheet.

3. The solar control film of claim 1 wherein said optically massive layer is a transparent layer with a refractive index between 1.4 and 1.7 and a thickness greater than 1 micrometer.

4. The solar control film of claim 1 wherein said optically massive layer is a laminating adhesive that is located directly between said SLR film and said transparent film of metal.

5. The solar control film of claim 4 wherein said second transparent substrate is affixed to a window such that said second transparent substrate is nearer to said window than said first transparent substrate.

6. A solar control film having low visible light transmittance and low visible light reflectance comprising:

a first sheet of transparent substrate material having deposited thereon a Fabry-Perot interference filter for preferentially reducing infrared light energy transmitted through said film, said interference filter comprising a film stack on a first surface of said first sheet, said film stack including at least a first oxide film proximate to said first sheet, a first metal film, a second oxide film, a second metal film, and a third oxide film;

a second sheet of transparent substrate material having deposited thereon a transparent layer of metal effective to partially block light transmittance and to have a low visible light reflectance; and an optically massive layer located between said first and second transparent substrates.

7. The solar control film of claim 6 wherein said layer of metal is a layer of grey metal.

8. The solar control film of claim 7 wherein said layer of grey metal is a layer of nickel chromium.

9. The solar control film of claim 7 wherein said grey metal has an $A_{VIS}/R_{VIS}$ ratio of greater than 0.6 and a thickness range of 1–50 nm.

10. A solar control film having low visible light transmittance and low visible light reflectance comprising:
    a first sheet of transparent substrate material having first and second sides;
    a solar-load-reduction film stack on said second side of said first sheet of transparent substrate, said film stack including:
       a first oxide layer on said second side of said second sheet of transparent substrate;
       a first metal layer on said first oxide layer;
       a second oxide layer on said first metal layer;
       a second metal layer on said second oxide layer; and
       a third oxide layer on said second metal layer;
    a second sheet of transparent substrate material having first and second sides;
    a thin, transparent layer of grey metal on said second side of said second sheet of transparent substrate material; and
    a layer of adhesive between said solar-load-reduction film stack on said first sheet of transparent substrate material and said thin, transparent layer of metal on said second sheet of transparent substrate material.

11. The solar control film of claim 10 wherein said thin, transparent layer of grey metal is a nickel chromium layer.

12. The solar control film of claim 11 wherein said nickel chromium layer has an $A_{VIS}/R_{VIS}$ ratio of greater than 0.6.

13. The solar control film of claim 12 wherein said $A_{VIS}/R_{VIS}$ ratio for said nickel chromium layer in the range of 1.07–1.44.

14. The solar control film of claim 10 wherein said first, second, and third oxide layers have refractive indices greater than 1.5 and contribute no more than 10% to the total absorption of the solar control coating.

15. The solar control film of claim 14 wherein said first metal layer and said second metal layer include silver alloy with less than 50% gold or copper.

16. The solar control film of claim 10 wherein said solar-load-reduction film stack layer thickness ranges are:
    said first oxide layer=15–60 nanometers;
    said first metal layer=4–25 nanometers;
    said second oxide layer=30–1200 nanometers;
    said second metal layer=4–25 nanometers; and
    said third oxide layer=15–60 nanometers.

17. The solar control film of claim 10 further including a second thin, transparent layer of grey metal on said first side of said second sheet of transparent substrate material.

18. The solar control film of claim 10 further including:
    a third sheet of transparent substrate material having first and second sides; and
    a thin, transparent layer of grey metal on said second side of said third sheet of transparent substrate material;
    wherein said layer of grey metal on said third sheet is affixed to said first side of said second sheet of transparent substrate material.

19. The solar control film of claim 10 wherein said solar-load-reduction film stack further includes a third metal layer on said third oxide layer and a fourth oxide layer on said third metal layer.

20. The solar control film of claim 10 further including:
    a pressure-sensitive adhesive directly adjacent to said first side of said first sheet of transparent substrate material; and
    a hardcoat layer directly adjacent to said first side of said second sheet of transparent substrate material.

* * * * *